(12) United States Patent
Sood et al.

(10) Patent No.: US 11,876,681 B2
(45) Date of Patent: Jan. 16, 2024

(54) TOPOLOGY RECOMMENDATION PLATFORM FOR APPLICATION ARCHITECTURE

(71) Applicant: MICROSOFT TECHNOLOGY LICENSING, LLC, Redmond, WA (US)

(72) Inventors: Sushant Sood, Marysville, WA (US); Piyush Gupta, Sammamish, WA (US); Jeremy Michael Bares, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/807,675

(22) Filed: Jun. 17, 2022

(65) Prior Publication Data
US 2023/0412461 A1 Dec. 21, 2023

(51) Int. Cl.
H04L 41/12 (2022.01)
H04L 41/0654 (2022.01)
H04L 43/04 (2022.01)
H04L 41/16 (2022.01)
G06F 18/21 (2023.01)

(52) U.S. Cl.
CPC ............ *H04L 41/12* (2013.01); *G06F 18/217* (2023.01); *H04L 41/0654* (2013.01); *H04L 41/16* (2013.01); *H04L 43/04* (2013.01)

(58) Field of Classification Search
CPC .......... H04L 49/90; H04L 67/32; H04L 67/10
See application file for complete search history.

(56) References Cited

U.S. PATENT DOCUMENTS 10,684,940 B1 * 6/2020 Kayal ................. G06F 11/3664
10,733,287 B2 8/2020 Kesarwani et al.
11,080,157 B1 8/2021 Roberts
(Continued)

OTHER PUBLICATIONS

"Patterns for Scalable and Resilient Apps", Retrieved from: https://web.archive.org/web/20210506092818/https://cloud.google.com/architecture/scalable-and-resilient-apps, May 6, 2021, 22 Pages.
(Continued)

*Primary Examiner* — Nicholas R Taylor
*Assistant Examiner* — Sanjoy Roy
(74) *Attorney, Agent, or Firm* — Holzer Patel Drennan

(57) ABSTRACT

The disclosure is directed to a topology recommendation platform that implements a method that includes receiving an original topology that indicates a first design for an application. The original topology is associated with a first resiliency score. The first design is associated with a set of functionalities for the application. A recommended topology is determined based on a model and the original topology. The recommended topology indicates an alternative design for the application. The recommended topology is associated with a second resiliency score that is greater than the first resiliency score. The alternative design is associated with the set of functionalities for the application. The recommended topology is provided. The original topology and/or the recommended topology is based on and/or encoded via one or more topology templates. The first design indicates a first set of components for the application. The alternative design indicates an alternative set of components for the application.

17 Claims, 6 Drawing Sheets

(56) References Cited

U.S. PATENT DOCUMENTS

| | | |
|---|---|---|
| 11,223,552 B1 | 1/2022 | Anderson et al. |
| 2014/0310559 A1* | 10/2014 | Deng .................. G06F 9/45533 |
| | | 714/37 |
| 2018/0039570 A1* | 2/2018 | Rajagopalan ....... G06F 11/3676 |
| 2018/0103052 A1* | 4/2018 | Choudhury ............. H04L 63/20 |
| 2018/0359201 A1 | 12/2018 | Rangasamy et al. |
| 2019/0138383 A1 | 5/2019 | Barowy et al. |
| 2021/0092143 A1 | 3/2021 | Sbandi et al. |
| 2021/0392049 A1* | 12/2021 | Jeuk ........................ H04L 47/74 |

OTHER PUBLICATIONS

Will, Scott, "Improve Application Resiliency with Chaotic Testing", Retrieved from: https://www.ibm.com/garage/method/practices/manage/practice_chaotic_testing/, Retrieved on: Mar. 2, 2022, 5 Pages.

* cited by examiner

TOPOLOGY RECOMMENDATION PLATFORM FOR APPLICATION ARCHITECTURE

BACKGROUND

Since the inception of the practice of computer programming, software applications have been subject to problems arising from unforeseen circumstances or scenarios that occur during their execution. That is, after an application has been developed and deployed in an operational environment, when it is executed by one or more physical computing machines or virtual computing machines (e.g., computing devices), the application can experience environmental scenarios for which the application's designers and/or developers did not anticipate. For example, due to increased usage, a network component of the application may gradually or suddenly experience increased traffic. If the increase in usage was not anticipated, the network component may not have sufficient bandwidth to meet the needs of the increased usage. In such a scenario, the application may not perform within user expectations, or the application may even "crash." The term "resiliency" is typically employed to describe an application's ability to react to issues in one or more of its components, and still provide the best possible service to its users.

Due to the increasing scope of operations and functionality, the designs of applications have increasingly become more complex. The increasing complexity has made the design task of anticipating all possible operational scenarios in the application's environment more difficult. Further increasing the difficulty of this design task is the fact that, due to the increased connectivity of physical hardware devices, the various layers and components (e.g., the topology) of many modern applications have been distributed and/or virtualized across multiple distributed devices. Yet, the task of designing extremely resilient applications is of critical importance, due to the global economy's increasing reliance on the "24-7" operability of various applications. That is, more and more users are considering more and more applications as "mission-critical" applications. However, due to the increasing difficulty of anticipating all possible operational scenarios for complex applications, users may find many modern mission-critical applications less resilient than what they expect or require.

SUMMARY

Various embodiments of the technology described herein are generally directed to a topology recommendation platform (TRP). The TRP of the embodiments receive an original topology for an application to be developed. Some of the embodiments analyze the original topology for issues that may decrease a resiliency score of the application. The TRP employs various heuristics, rules, and/or models to determine a recommended topology for the application. If adopted for application development, the recommended topology results in an application with the same (or similar) functionalities of the original topology proposed by the developer. However, the recommended topology is associated with an increased resiliency score, as compared to an application developed via a topology that was initially proposed (referred to herein as the "original topology").

In various embodiments, rules, heuristics, and/or models are employed to determine a recommended topology (with improved resilience) based on the original topology and the functionalities of the original topology. Some embodiments receive an original topology and employ one or more rules or heuristics to improve upon the original topology and determine a recommended topology with an improved resiliency score. The recommended topologies determined by rules-based embodiments are enabled to provide equivalent (or at least similar) functionalities as the original topology. In other embodiments, trained machine learning (ML) models are employed to determine a recommended topology based on the original topology and the functionalities of the original topology. Such embodiments may receive an original topology and employ one or more trained ML models to determine a recommended topology, with a higher resiliency score. The recommended topology provides equivalent (or at least similar) functionalities of the original topology. In still other embodiments, both rules and ML models may be employed to recommend an improved technology.

In addition to providing recommended (and more resilient) topologies with functionalities similar to the original topology, the TRP may recommend "experiments" that, if performed, provide greater insight into the improved resiliency of, as well as potential improvements to, the recommended topologies. The methods of designing and carrying-out such recommended experiments may be referred to as "chaos engineering." In addition to a TRP, some embodiments include application resiliency data services (ARDS). The ARDS can provide various chaos-engineering services to the TRP. For example, the ARDS may perform chaos-engineering experiments and provide the results to the TRP.

In at least one embodiment, a computer-implemented method (e.g., implemented by the TRP) includes receiving an original topology that indicates a first design for an application. The original topology is associated with a first resiliency score. The first design is associated with a set of functionalities for the application. A recommended topology may be determined based on one or more rules, heuristics, and/or models and the original topology. The recommended topology may indicate an alternative design for the application. The recommended topology may be associated with a second resiliency score that is greater than the first resiliency score (or otherwise indicative of a higher resiliency). The alternative design may be associated with the set of functionalities for the application. The recommended topology is provided (e.g., to a user). At least one of the original topology or the recommended topology may be based on and/or encoded via one or more topology templates. The first design may indicate a first set of components for use by the application. The alternative design may indicate an alternative set of components use by the application.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology disclosed herein is described in detail below with reference to the attached drawing figures, wherein.

DETAILED DESCRIPTION

Figure 1:
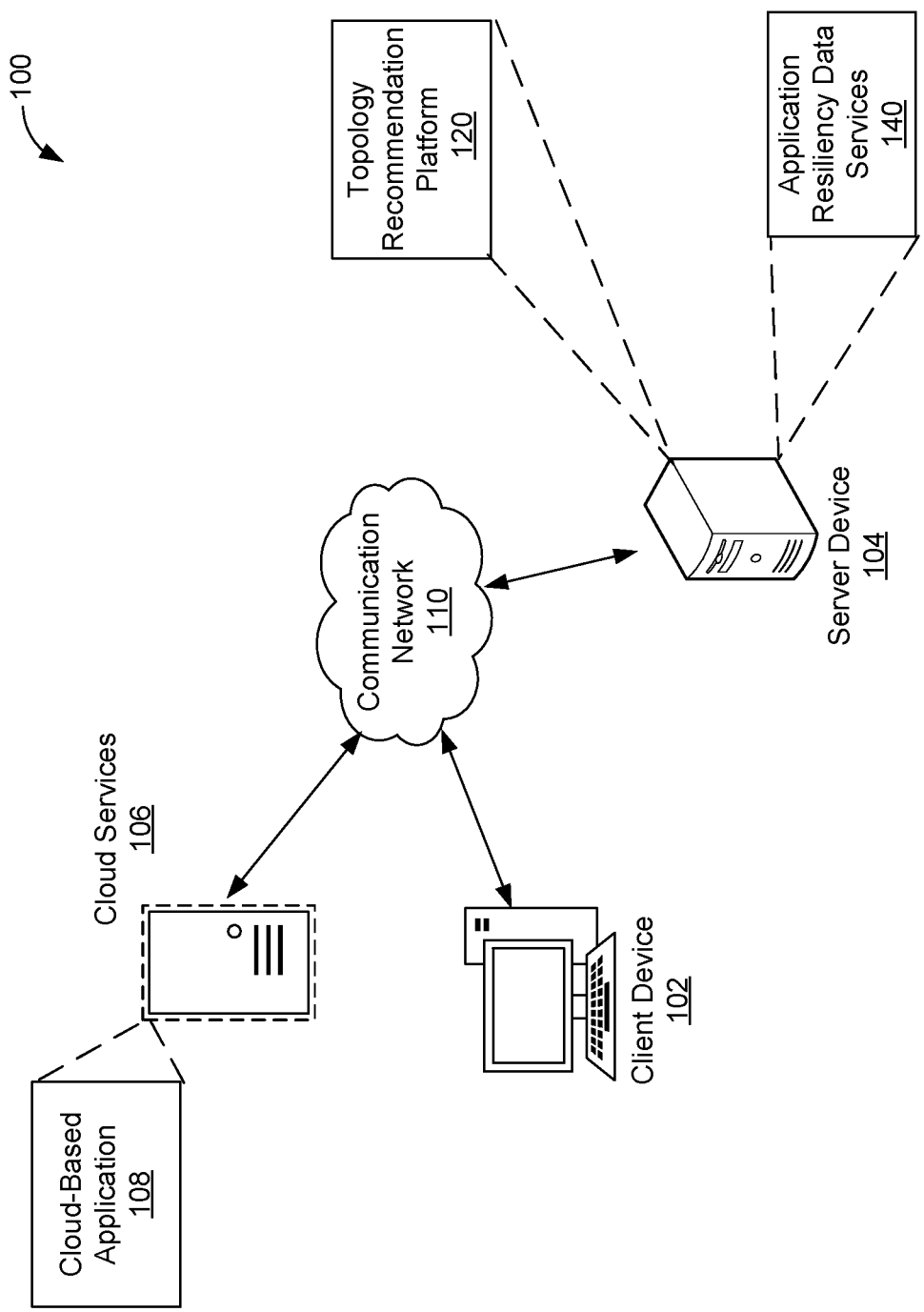
FIG. 1 illustrates an example environment for recommending improved topologies for an application in accordance with various embodiments.

Conventional approaches to increasing a computer software application's resiliency are often "reactive." That is, conventionally, a computer software application, such as a computer program or routine, is designed and developed. Then only after the development is complete (or at least close to completion), is the application tested for resiliency. In some of these conventional approaches, after design and development, the application is then provided to a software "test-bed." The goal of a software test-bed is to simulate the application's environment. When subjected to a test-bed, the application may be executed under a variety of conditions, and the application's functionality may be monitored to check for issues that arise in the test-bed. The test-bed may be enabled to detect issues that decrease the functionality of the application, under the variety of tested conditions. A portion of such issues may be addressed by post-development "tweaking" of the application's design (e.g., updating an application's topology). In addition to being expensive and labor-intensive, such conventional reactive approaches can have limited capability to increase an application's resiliency. Further, in some conventional approaches, rather than subjecting the application to a test-bed prior to deploying the application to users, the developers will deploy the application to its users and then collect user-generated data as its test-bed data. In this way, actual users are testing the application and may be exposed to various errors or problems. In particular, these less-than-ideal conventional, reactive approaches are referred to as "shift-right" approaches to software design and development. Shift-right approaches run the risk of disappointing user's expectations and delivering underperforming software-based applications.

In contrast to these conventional, reactive approaches, such as shift-right, the embodiments described herein provide a "proactive" approach to software design and development. That is, these embodiments provide platforms, systems, and methods that are enabled to increase an application's resiliency prior to developing the application and subjecting it to a test-bed. In contrast to a shift-right approach, the embodiments described herein provide a "shift-left" approach to application design, development, and testing. In contrast to shift-right, the term shift-left indicates that the testing phase is shifted more towards the beginning (e.g., left as opposed to right) of the application's design and development efforts. By programmatically addressing an application's resiliency during the initial design stages, the embodiments provide more resilient applications than the conventional approaches. By enabling the development of significantly more resilient applications, the embodiments of this disclosure clearly provide improved performance of software and hardware solutions for any domain of activity of which the software is used.

More specifically, these embodiments provide a topology recommendation platform (TRP). The "topology" of an application refers to a mapping of the layers and/or components that an application is comprised of, as well as the connectivity, interoperability, and dependencies of the layers and components. The TRP of the embodiments receives an original topology for an application to be developed. The original topology may be received from a user, such as a software developer. The TRP of the embodiments can then process and analyze the original topology by performing specific computing operations, to detect issues that decrease the application's resiliency. For example, a specific problem can be detected that may result in a decreased "resiliency score" of the application. The TRP further employs various heuristics, rules, and/or models to determine a recommended topology for the application where, if adopted for its development, the recommended topology results in an application with the same (or similar) functionalities of the original topology, but an increased resiliency score, compared to an application developed via the original topology.

In various embodiments, rules, heuristics, and/or models are employed to determine a recommended topology (with improved resilience) based on the original topology and its functionalities. Embodiments that employ rules or heuristics to determine a recommend topology are referred to as rules-based embodiments. Such embodiments receive an original topology and employ one or more rules or heuristics to improve upon the original topology and determine a recommended topology with an improved resiliency score. The topologies recommended by rules-based embodiments are enabled to provide equivalent (or at least similar) functionalities as the original topology. In other embodiments, machine learning (ML) models (rather than rules or heuristics) are employed to determine a recommended topology based on the original topology and the functionalities of the original topology. Thus, embodiments that employ ML models to determine improved topologies are referred to as ML-based embodiments. Such ML-based embodiments may receive an original topology and employ one or more trained topology recommendation models to determine a recommended topology, with a higher resiliency score. The recommended topology provides equivalent (or at least similar) functionalities of the original topology. In still other embodiments, both rules and ML models are employed to recommend and improve technology. Such embodiments are referred to as mixed embodiments because both rules and models are used.

As used herein, the resiliency score of an application (or a topology) refers to one or more metrics that indicate a resilience of the application. Typically, a higher resiliency score indicates a more resilient application. In addition to being associated with a higher resiliency score than the original topology, the recommended topology is enabled to provide equivalent (or at least similar) functionalities for an application developed with the original topology. Accordingly, a recommended topology that is associated with a higher resiliency score than the original topology and still provides equivalent (or at least similar) functionalities as the original topology is an improvement over the original topology.

The TRP may be employed prior to developing the application. Accordingly, the application may be developed with the recommended topology, and not the inferior original topology. Thus, applications developed using the embodiments of the TRP described herein are typically more resilient and better performing than conventionally developed applications. For example, the functionalities of the application as specified via the recommended topology may be less likely to fail, be less prone to errors problems, be more robust in terms of ability to perform when computer resources are limited (e.g., when less memory or bandwidth is available to application), use less computer resources (e.g., more efficient processing, memory, bandwidth), provide improved security (e.g., less likely to be hacked), be more compatible when operating with other applications or operating on various platforms, or have other improvements to their operation. Moreover, although the recommended topology provides equivalent or similar functionalities to the original topology, an application developed from the recommended topology can include fundamental differences in the code or computer instructions, computer resources that are utilized, and operations that are performed by the application In particular, it is a different computer program with different computer functions or operations than what would be part of an application generated from the original topology. However, because the functions are equivalent or similar, the application generated by the recommended topology is expected to perform services that are equivalent or similar to an application that would be generated according to the original topology. In some instances, the end user of the application may be unaware of the differences. As a simple example, in computer programming, a first function that implements a FOR loop and a second function that implements a WHILE loop may be used interchangeably in some circumstances. Therefore, in some circumstances of this simple example, these two functions can be considered equivalent alternative functions. The performance of each function by a computer processor will entail performing different operations. In some embodiments, services may comprise multiple functions and performing a service may entail performing multiple computer operations. In addition to more resilient and better performing applications, developing an application with the embodiments of the TRP described herein decreases the cost, labor, and time-budgets of such development efforts.

Applications (and thus their underlying topologies) developed via the embodiments of the TRP described herein may be layered, distributed, and/or virtualized. That is, the components of the topologies may be virtualized components and/or distributed across multiple remote hardware devices. By way of example, a component can comprise a program function, routine, service, dependency, software program, library, a computer application or system resource that is used by an application, and may be embodied as hardware, software, a combination thereof, or virtual. The original and recommended topologies may be comprised of multiple layers, and each layer may be comprised of distributed and/or virtualized components. As used herein, the terms "virtual" and "virtualized," as in virtualized component, virtual machine, virtual network, virtual storage systems, for example, are terms of the art. The terms "virtual" and "virtualized" do not imply that a particular component does not exist. Rather, the terms "virtual" and "virtualized" refer to a computer component such as a machine, network, storage system, computer, processor, or the like, that is created using software on a physical computer (or a physical distributed computing system like the cloud) in order to emulate the functionality of another, separate physical computer component, such as a machine, network, storage system, computer, processor, or the like. Thus, the emulated physical component is referred to as a virtual component.

In addition to providing recommended (and more resilient) topologies with functionalities similar to the original topology, the TRP may recommend "experiments" that, if performed, provide greater insight into the improved resiliency of, as well as potential improvements to, the recommended topologies. The methods of designing and carrying-out such recommended experiments may be referred to as "chaos engineering." The experiments performed for chaos engineering may be referred to as chaos-engineering experiments, or "chaos experiments" for a shortened terminology. In addition to a TRP, the various embodiments described herein may include application resiliency data services (ARDS). The ARDS may provide various chaos-engineering services to the TRP. The ARDS may perform chaos-engineering experiments and provide the results to the TRP. Accordingly, the ARDS may be referred to as a "chaos engineering platform."

Chaos-engineering experiments (e.g., performed by the ARDS) can include curated steps that enable identifying portions in an application's design (e.g., portions of the topology of the application) that may result in the application being less resilient than is necessary to achieve the same functionality. The results of such chaos-engineering experiments can be employed to improve resiliency of the application and/or topology. Such chaos-engineering experiments may include intentionally simulating and/or providing potentially adverse scenarios (or states) of operation to a topology (e.g., the original topology and/or the recommended topology) and/or an application developed from the recommended topology. Such chaos-engineering experiments may include applying perturbation models that intentionally "inject" faults into the components of the topology. Such fault-injections include component shutdowns and/or failures, the injection of various latencies into the components, the increase (or decrease) of component usage (e.g., component exhaustion), the limiting of component bandwidth, and the like.

The TRP may employ various ML methods to train the one or more ML models that are used in the ML-based and mixed embodiments. Such ML models are referred to as topology recommendation models. Once trained, the topology recommendation models may be employed to determine a recommend topology, with equivalent and/or similar functionalities. In at least one embodiment, the TRP is configured to receive a stream of data of the results from chaos-engineering experiments. The TRP can receive such a chaos-engineering experimental data stream from the ARDS. The chaos-engineering experimental data may include the results of various chaos experiments performed on topologies and/or or applications with various topologies. For example, the chaos experiments may have been performed on topologies with functionally equivalent and/or at least similar to the original topology. The set of all possible recommended topologies (e.g., the set of all topologies that the TRP may recommend, in view of the original topology) may be referred to as the set of candidate recommended topologies. The ARDS may perform chaos experiments on topologies equivalent or similar to the original topology, as well as the set of candidate recommended topologies. The ARDS and/or the TRP may be enabled to assign (or associate) a resiliency score to a topology based on the results of sufficient chaos experiments performed on the topology.

The ARDS may provide the results of such chaos experiments for various topologies, as well as the resiliency scores associated with the various topologies to the TRP. The TRP may employ the chaos experimental data and resiliency scores as training data to train one or more topology recommendation models. The TRP may apply various ML methods (e.g., supervised and/or unsupervised learning methods) to train one or more topology recommendation models. For example, the chaos experimental data and resiliency scores may serve as labeled training data. Once trained, a topology recommendation model may receive, as input, an original topology. The output of the trained topology recommendation model may include a recommended topology. The recommended topology may have similar functionalities to the original topology, but a greater associated resiliency score.

In at least one embodiment, the ARDS provides a stream of chaos-engineering experimental data to the TRP. Such data can be used as additional training data for the continuous or ongoing improvement of the trained topology recommendation models. In at least one embodiment, this stream of chaos experimental data comprises a continuous data stream for ongoing improvement of the trained topology recommendation models. As used herein, the term continuous does not mean unceasing in time, as the data stream (and improvements) may arrive as temporally discrete packets or quanta. Rather, continuous means that the data packets (and improvements) can be received (or generated) in an ongoing manner, into the future. In at least one embodiment, the TRP employs the stream of chaos experimental data as training data for one or more reinforcement learning (RL) methods. The RL methods are used to generate a "model improvement" policy. The policy may be applied to the trained topology recommendation models so that the models, which may be already trained, can be further trained or otherwise improved in an ongoing manner. "Policy" as used herein is a term of the art that refers to a mechanism used in ML to guide learning, such as ML model training, and can include instructions or logic to determine or specify operations to be performed in order to achieve a particular result. An "improved" topology recommendation model outputs a recommended topology with a resiliency score that is even higher than the recommended topology outputted prior to the improvement of the trained model. Thus, the TRP may employ RL to update the topology recommendation models as topologies and application architectures evolve in the future.

In some embodiments, the TRP is implemented in an application development environment and provides a real-time or near-real-time indication of resiliency along with an alternative, recommended topology or elements of an alternative, recommended topology. For example, for a particular element of an original topology (or a function, proposed by a programmer, of an application in development), a resiliency score may be determined and presented to a programmer along with a corresponding element of a recommended topology (or recommended alternative function for the application in development).

As used herein, the term "set" may be employed to refer to an ordered (i.e., sequential) or an unordered (i.e., non-sequential) collection of objects (or elements), such as machines (e.g., computer devices), physical and/or logical addresses, graph nodes, graph edges, functionalities, and the like. As used herein a set may include N elements, where N is any positive integer. That is, a set may include 1, 2, 3, . . . N objects and/or elements, where N is a positive integer with no upper bound. Therefore, as used herein, a set does not include a null set (i.e., an empty set), that includes no elements (e.g., N=0 for the null set). A set may include only a single element. In other embodiments, a set may include a number of elements that is significantly greater than one, two, three, or billions of elements. A set may be an infinite set or a finite set. The objects included in some sets may be discrete objects (e.g., the set of natural numbers $\mathbb{N}$). The objects included in other sets may be continuous objects (e.g., the set of real numbers $\mathbb{R}$). In some embodiments, "a set of objects" that is not a null set of the objects may be interchangeably referred to as either "one or more objects" or "at least one object," where the term "object" may stand for any object or element that may be included in a set. Accordingly, the phrases, "one or more objects" and "at least one object" may be employed interchangeably to refer to a set of objects that is not the not null or empty set of objects. A set of objects that includes at least two of the objects may be referred to as "a plurality of objects."

As used herein, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjoint sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end-user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

As used herein, the terms "source code" and "code" may be used interchangeably to refer human-readable instructions that at least partially enable the execution of an application. Source code maybe encoded in one or more programming languages, e.g., Fortran, C, C++, Python, Ruby, Julia, R, Octave, Java, JavaScript, and the like. In some embodiments, prior to enabling an execution of an application, source code may be subjected to a compilation and/or linking process. As used herein, the term "executable" may refer to any set of machine instructions that instantiate a copy of an application and enable the one or more computing machines (e.g., a physical or virtual machine) to execute, run, or otherwise implement the instantiated application. An application may include a set of executables. An executable may be a binary executable, e.g., a set of executable machine instructions generated via the compilation of human-readable source code (in a programming language) and linking of the binary objects generated via the compilation. That is, an executable for an application may be generated via compiling the source code for the application. Although the embodiments are not so limited, an application may include human-readable source code, e.g., applications generated via interpreted programming languages. For instance, an executable for the application may include the source code for the application. An executable may include one or more binary executables, one or more source code-based executables, or any combination thereof. An executable may include and be dependent upon one or more libraries of functions, objects, or the like. An executable may be encoded in a single file, or the encoding may be distributed across multiple files. That is, an encoding of an executable may be distributed across a plurality of files. The encoding may include one or more data files, where the execution of the application may be dependent upon reading and/or writing to the one or more data files.

Environments for Recommending Improved Topologies

FIG. 1 illustrates an example environment 100 for recommending improved topologies for an application in accordance with the various embodiments. Example environment 100 includes a client device 102 and a server device 104. At least one of the client device 102 and the server device 104 implements a topology recommendation platform 120. The environment 100 may additionally include "cloud" (or web-based) services 106. As indicated by the dashed lines, the cloud services 106 may be implemented by one or more distributed, virtualized, and/or cloud platforms that may include one or more virtual machines (VMs), virtual storage systems, virtual networks, and the like. Cloud services 106 may implement one or more applications, such as cloud-based (or web-based) application 108. In some embodiments, cloud-based application 108 comprises a distributed application that is designed and developed via a topology comprised of layers and/or components.

The client device 102, the server device 104, and the cloud services 106 may be communicatively coupled via communication network 110. Note that, although shown as a single server device, server device 104 may be comprised of multiple physical machines and/or multiple virtual machines. At least one of server device 104 and client device 102 may implement a topology recommendation platform (TRP) 120. If the server device 104 (which may be comprised of multiple physical and/or virtual machines) implements the TRP 120, then the client device 102 may be provided the services of TRP 120 via communication network 110. At least one of server device 104 and client device 102 may implement application resiliency data services (ARDS) 140. In at least one embodiment, the ARDS 140 is implemented by one or more physical and/or virtual machines that are not explicitly shown in FIG. 1. Regardless of which combination of physical and/or virtual machine implements TRS 120, ARDS 140, and cloud-based application 108, TRS 120, ARDS 140, and cloud-based application 108 may be communicatively coupled via communication network 110.

Figure 2:
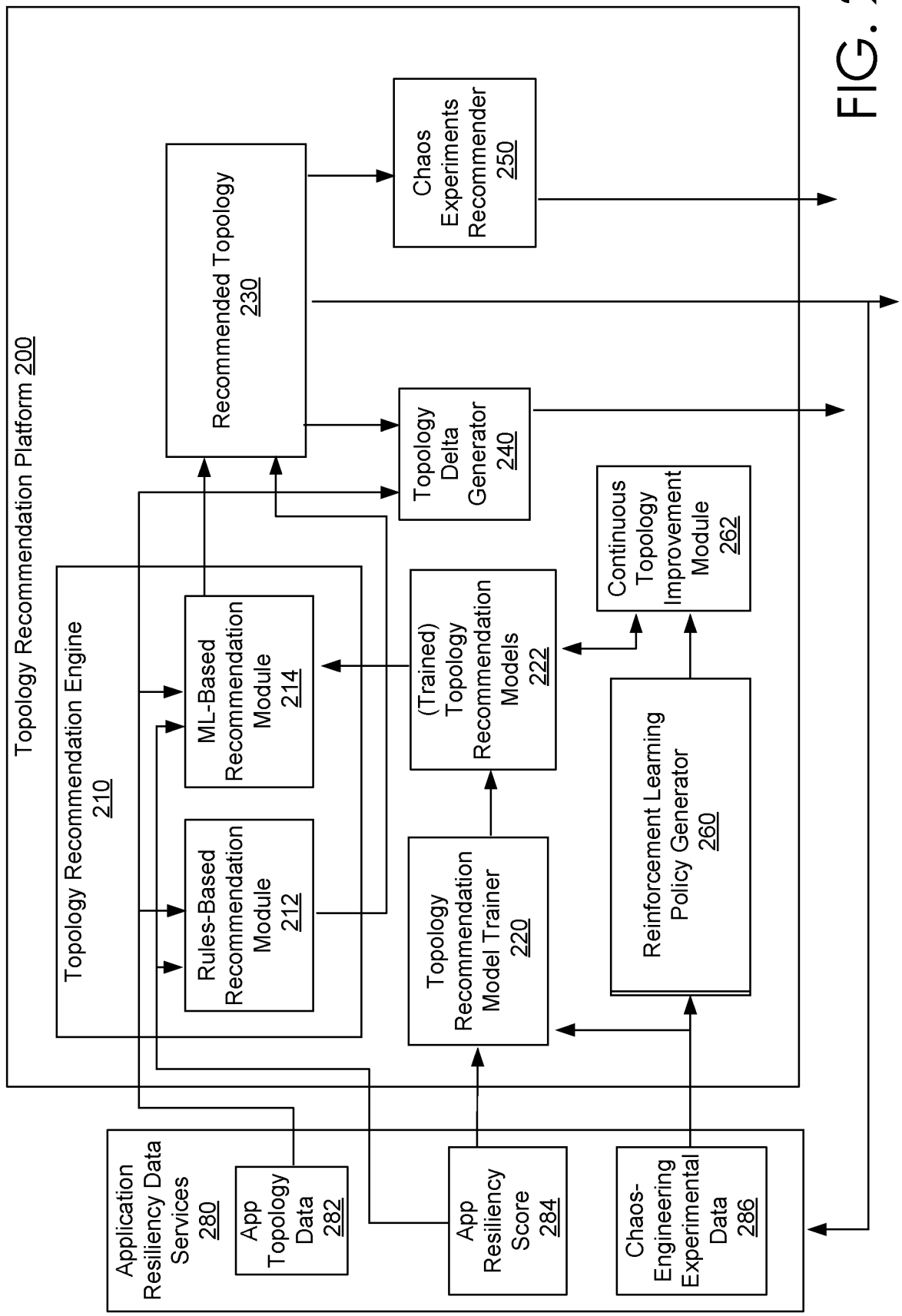
FIG. 2 illustrates an example embodiment of a topology recommendation platform and application resiliency data services, in accordance with various embodiments.

Various embodiments of TRP 120 and ARDS 140 are discussed in conjunction with at least FIG. 2. However, briefly here, TRP 120 is enabled to determine an "improved" recommended topology for an application to be developed, given an original topology for the application. The ARDS 140 may be generally responsible for providing the original topology for the application to the TRP 120. Various embodiments of a topology are discussed in conjunction with at least FIG. 3A. Briefly, the topology of an application refers to a mapping of the layers and/or components that an application is comprised of, as well as the connectivity, interoperability, and dependencies of the layers and components. The TRP 120 receives an original topology for an application to be developed. TRP 120 analyzes the original topology for issues that may decrease the resiliency score of the application. The TRP 120 employs various heuristics, rules, and/or ML models to determine a recommended topology for the application, where, if adopted for its development, the recommended topology results in an application with an increased resiliency score, compared to an application developed via the original topology. The resiliency score of an application (or a topology) refers to one or more metrics that indicate a resilience of the application. A higher resiliency score indicates a more resilient application than an application with a lower resiliency score.

The TRP 120 may be employed prior to developing the application. Accordingly, the application may be developed with the recommended topology, and not the original topology. Accordingly, applications developed via the TRP 120 may be more resilient and better performing than conventionally developed applications. In addition to more resilient and better performing applications, developing an application with the embodiments of the TRP decreases the cost, labor, and time-lines of such development efforts.

In addition to providing recommended (and more resilient) topologies, the TRP 120 may recommend experiments that, if carried out, would provide greater insight into the improved resiliency of, as well as potential improvements to, the recommended topologies. The ARDS 140 may be generally responsible for carrying out such experiments. As described previously, the methods of designing and carrying out such recommended experiments may be referred to as "chaos engineering." Thus, ARDS 140 may include a chaos-engineering platform. In at least one embodiment, the TRP 120 is integrated with and/or embedded within the chaos-engineering platform. The recommended experiments may include intentionally simulating and/or providing potentially adverse scenarios or adverse states of operation to the recommended topology and/or an application developed from the recommended topology. Such recommended chaos-engineering experiments include applying perturbation models that intentionally "inject" faults into the components of the topology. Such fault-injections include component shutdowns and/or failures, the injection of various latencies into the components, the increase (or decrease) of component usage (e.g., component exhaustion), the limiting of component bandwidth, and the like.

In addition, the TRP 120 may employ various ML methods to train one or more models that are employed to recommend an improved topology. In at least one embodiment, the TRP 120 receives a stream of application fault-injection data from the ARDS 140, which includes the results of various chaos experiments performed on topologies and/or applications with various topologies. As noted above, some embodiments of the ARDS 140 are configured to perform such fault-injection experiments via its chaos-engineering capabilities. In still other embodiments, the TRP 120 employs RL methods to generate a policy that provides improvements to the recommended topologies. In some embodiments, ARDS 140 is responsible for providing a stream of fault-injection data, generated by fault-injection experiments, to generate a policy via the RL for the continued improvement of the recommended topologies.

Communication network 110 may be a general or specific communication network and may be directly and/or indirectly communicatively coupled to client computing device 102, server device 104, and cloud-based services 106. Communication network 110 may be any communication network, including virtually any wired and/or wireless communication technologies, wired and/or wireless communication protocols, and the like. Communication network 110 may be virtually any communication network that communicatively couples a plurality of computing devices and storage devices in such a way that computing devices are enabled to exchange information via communication network 110.

Embodiments of a Topology Recommendation Platform

FIG. 2 illustrates an embodiment of a topology recommendation platform 200 and application resiliency data services 280, in accordance with the various embodiments. TRP 200 may be similar to TRP 120 of FIG. 1. Likewise, ARDS 280 may be similar to ARDS 140 of FIG. 1. Thus, as discussed above, TRP 200 is enabled to determine an "improved" recommended topology for an application to be developed, given an original topology for the application. The ARDS 280 may provide the original topology for the application to the TRP 200. Various embodiments of a topology are discussed in conjunction with at least FIG. 3A. TRP 200 analyzes the original topology for issues that may decrease the resiliency score of the application. The TRP 120 employs various heuristics, rules, and/or ML models to determine a recommended topology for the application, where, if adopted for its development, the recommended topology results in an application with an increased resiliency score, compared to an application developed via the original topology. A higher resiliency score indicates a more resilient application than an application with a lower resiliency score.

TRP 200 and ARDS 280 may include various components, modules, and/or engines. Such components, modules, and/or engines of the TRP 200 may include a topology recommendation engine 210, a topology recommendation model trainer 220, one or more trained topology recommendation models 222, and one or more recommended topologies 230. TRP 200 may additionally include a reinforcement learning policy generator 260 and a continuous topology improvement module 262. In at least some embodiments, TRP 200 additionally includes a topology delta generator 240 and a chaos experiments recommender 250. As shown in FIG. 2, topology recommendation engine 210 includes a rules-based recommendation module 212 and a ML-based recommendation module 214. The components, modules, and/or engines of the ARDS 280 provide data (e.g., information) as inputs to TRP 200, such as application (app) topology data 282, an application resiliency score 284, and chaos-engineering experimental data 286.

The topology recommendation engine 210 is generally responsible for receiving an original topology and one or more resiliency scores associated with the original topology. The topology recommendation engine 210 is additionally responsible for generating, calculating, and/or determining one or more recommended topologies (e.g., recommended topology 230) based on the original topology and its associated one or more resiliency scores. The topology recommendation engine 210 may implement a topology recommendation model to determine the recommended topology. The topology recommendation model may be rules/heuristics based, based on a trained ML model, and/or a combination of the rules and ML models. The original topology may be encoded in the application topology data 282 and the one or more resiliency scores associated with the original topology may be encoded in the application resiliency score 284 of the ARDS 280. In at least one embodiment, the original topology encoded in application topology data 282 includes a topology of an application already developed and/or deployed.

As shown in FIG. 2, the application topology data (e.g., encoding the original topology) is provided to the topology recommendation engine 210 as an input to the TRP 200. In some embodiments, the ARDS 280 is enabled to assign one or more resiliency scores to an application that has been (or would be) developed via the original topology. For example, the ARDS 280 may have performed various chaos-engineering experiments via the original topology, one or more topologies that are similar to the original topology, and/or applications developed with the original and/or similar topologies. In such embodiments, the ARDS 280 provides the one or more resiliency scores (e.g., encoded in application resiliency score 284) to the topology recommendation engine 210 and/or the topology recommendation model trainer 220, as inputs to the TRP 200. In other embodiments, the TRP 200 is enabled to assign, determine, calculate, or generate one or more resiliency scores to associate with the original topology. For example, in at least one embodiment, the TRP 200 is enabled to perform chaos-engineering experiments (e.g., fault-injection experiments).

As noted above, the topology recommendation engine 210 is generally responsible for determining, generating, or calculating one or more recommended topologies (e.g., recommended topology 230) based on the original topology and/or the original topology's associated one or more resiliency scores (e.g., as encoded in application resiliency score 284). In some embodiments, the topology recommendation engine 210 determines a recommended topology based on one or more rules and/or heuristics. In other embodiments, the topology recommendation engine 210 determines a recommended topology based on one or more trained machine learning (ML) models (e.g., trained topology recommendation models 222). In still other embodiments, the topology recommendation engine 210 determines a recommended topology based on a combination of one or more rules and/or heuristics and one or more ML models.

The rules-based recommendation module 212 of the topology recommendation engine 210 is generally responsible for implementing the one or more rules and/or heuristics to determine the one or more recommended topologies for the original topology. Thus, the rules-based recommendation module 212 may be employed in rules-based embodiments, as well as mixed embodiments. The ML-based recommendation module 214 of the topology recommendation engine 210 is generally responsible for implementing the one or more trained topology recommendation models 222 to determine the one or more recommended topologies for the original topology. Thus, the ML-based recommendation module 214 may be employed in rules-based embodiments, as well as mixed embodiments. As shown in FIG. 2, the output of the rules-based recommendation module 212 may include one or more recommended topologies (e.g., recommended topology 230), determined via the one or more rules. The output of the ML-based recommendation module 214 may include one or more recommended topologies (e.g., recommended topology 230), determined via one or more topology recommendation models (e.g., trained topology recommendation models 222).

In some embodiments (e.g., rules-based embodiments), only the rules-based recommendation module 212 (and its output) is used to recommend a topology based on the original topology and its associated resiliency score. In other embodiments (e.g., ML-based embodiments), only the ML-based recommendation module 214 (and its output) is used to recommend a topology based on the original topology and its associated resiliency score. In still other embodiments (e.g., mixed embodiments), a combination of the outputs from both the rules-based recommendation module 212 and the ML-based recommendation module 214 is used to recommend a topology based on the original topology and its associated resiliency score.

In some embodiments, the topology recommendation engine 210 is enabled (via the rules-based recommendation module 212 and/or the ML-based recommendation module 214) to select one or more recommended topologies from a set of candidate recommended topologies. The selected one or more recommended topologies may serve as the recommended topology 230. In various embodiments, the topology recommendation engine 210 calculates and/or generates the set of candidate recommended topologies, based on the original topology, the associated resiliency scores of the original topology, and/or the functionalities of the application to be developed. In other embodiments, the set of candidate recommended topologies is predetermined. In at least one embodiment, the set of candidate recommended topologies includes the set of all possible topologies. For a shortened notation, the set of candidate recommended topologies may be referred to as the set of candidate topologies.

In at least one embodiment, topologies (e.g., the original topology as well as the set of candidate recommended topologies) are included in a set of template topologies. In such embodiments, the topologies are defined via topology templates. In some embodiments, the set of candidate recommended topologies is determined based on the functionalities of the original topology and/or the functionalities of the application to be developed. For example, to determine the set of candidate recommended topologies, a set of all possible topologies may be filtered based on the original topology. In such embodiments, each topology in the set of candidate recommended topologies is enabled to perform equivalent (or at least similar) functionalities as the original topology.

The resiliency score of the recommended topology 230 is generally higher than the resiliency score of the original topology. In various embodiments, the topology recommendation engine 210 is enabled to compare the resiliency score of the original topology to other topologies (e.g., the topologies included in the set of candidate recommended topologies). Given an application's functionalities (or the functionalities associated with the original topology), the topology engine (via the rules-based recommendation module 212 and/or the ML-based recommendation module 214) is enabled to determine and/or calculate a recommend topology that has a higher resiliency score than the original topology. In some embodiments, the topology recommendation engine is enabled to determine and/or calculate the resiliency score associated with one or more candidate recommended topologies in the set of candidate recommended topologies. In other embodiments, the ARDS 280 is leveraged to determine resiliency scores for candidate recommended topologies. The feedback loop from the recommended topology 230 back into the ARDS 280 (indicated by the arrowed-lines) is intended to show how a candidate recommended topology can be fed into the ARDS 280 so that the ARDS can determine a resiliency score for the candidate recommended topology. The ARDS 280 can then provide the resiliency score (via the application resiliency score 284 data stream) back to the topology recommendation engine 210.

In at least one embodiment, the topology recommendation engine 210 (via the rules-based recommendation module 212 and/or the ML-based recommendation module 214) optimizes (or at least approximately optimize) the recommended topology by selecting a candidate recommended topology with the largest associated resiliency score, in view of the functionalities of the original topology. For example, the set of candidate recommended topologies may be ranked via their associated resiliency scores. The highest-ranking candidate recommended topology may be selected as the recommended topology 230.

At least a portion of the one or more rules or heuristics employed by the rules-based recommendation module 212 may include automatically and/or manually created and/or curated "rules-of-thumb" that tend to improve the resiliency of the original topology. At least a portion of the rules or heuristics may have been generated via experience with chaos-engineering experiments (e.g., fault-injection experiments). In at least one embodiment, at least a portion of the rules or heuristics are automatically and/or manually generated based on at least a portion of the chaos-engineering experimental data 286.

For ML-based and mixed embodiments (e.g., those embodiments that employ the ML-based recommendation module 214 to recommend topologies), the topology recommendation model trainer 220 is generally responsible for training topology recommendation models 222. The chaos-engineering experimental data 286 may include resiliency data collected for various topologies (e.g., topologies that could be included in the set of candidate recommended topologies). As shown in FIG. 2, application (or topology) resiliency scores 284, as well as the chaos-engineering experimental data 286 may be provided as inputs to the topology recommendation model trainer 220. The topology recommendation models 222 may include models that generate a vector embedding for topologies, such as topology recommendation models 222 that are implemented by one or more neural network architectures. The topology recommendation model trainer 220 may employ the chaos-engineering experimental data 286 and/or the application resiliency scores 284 as training data (e.g., labelled training data). Various methods of supervised or unsupervised learning may be employed to train topology recommendation models 222. For example, the application resiliency score 284 and/or the chaos-engineering experimental data 286 may be employed as labelled training data. Various embodiments may employ machine learning methods such as gradient descent (or boost), backpropagation, and the like to train the topology recommendation models 222. The one or more trained topology recommendation models 222 may be enabled to receive an original topology as an input. The output of a trained topology recommendation models 222 may include one or more recommended topologies with associated resiliency scores that are greater than the resiliency score of the inputted original topology. As noted above, vector embedding of the topologies may be employed to determine a recommended topology that increases the resiliency score.

In at least one embodiment, the ARDS 280 provides a stream of chaos-engineering experimental data (e.g., chaos-engineering experimental data 286) to the TRP 200. Such data may serve as additional training data for the continuous improvement of the trained models. In at least one embodiment, this stream of chaos experimental data is a "continuous" data stream for the "continuous" improvement of the trained models. In at least one embodiment, the TRP 200 employs the stream of chaos experimental data as training data for one or more RL methods. The RL methods are used to generate a "model improvement" policy. The policy may be applied to the trained recommendation models to result in continuously improving the already trained models. An "improved" topology recommendation model outputs a recommended topology with a resiliency score that is even higher than the recommended topology outputted prior to the improvement of the trained model. Thus, the TRP may employ RL to update the topology recommendation models as topologies and application architectures evolve in the future.

The RL policy generator 260 is generally responsible for receiving the stream of chaos-engineering experimental data (e.g., chaos-engineering experimental data 286). The RL policy generator 260 employs the chaos-engineering experimental data 286 to generate the policy, via various RL methods. Because additional data is periodically being received, the RL policy generator 260 may periodically (e.g., somewhat continuously) update the policy. As shown in FIG. 2, the RL policy generator 260 provides the policy to the continuous topology improvement module 262. Also, one or more of the trained topology recommendation models 222 may be provided to the continuous topology improvement module 262. The continuous topology improvement module 262 may employ the policy to "continuously" (or periodically) improve the one or more trained topology recommendation models 222. The improved models may be provided back to the trained topology recommendation models 222. Upon improvement, the topology recommendation models may be continued to be employed in ML-based and mixed embodiments.

The original topology (e.g., encoded in the application topology data 282 signal), as well as the recommended topology 230, may be provided to the topology delta generator 240. The topology delta generator 240 may generate a "delta topology" based on these inputs. In the various embodiments, a delta topology may be a topology that includes the difference or "delta" between original topology and the recommended topology. The topology delta generator 240 may employ a "difference engine" or a "difference function" to generate the delta topology. The topology delta generator 240 may generate a delta topology map, which may be a visual indication of the delta topology. For instance, the delta topology map may be somewhat analogous to a "redline," a "difference," or a "compare" version of a document or file. In addition to the recommended topology, the TRP 200 may output the delta topology.

As noted above, in addition to providing recommended topologies (e.g., recommended topology 230) with functionalities similar to the original topology, the TRP 200 may recommend "chaos experiments" that, if performed, would provide greater insight into the improved resiliency of, as well as potential improvements to, the recommended topologies. The chaos experiments recommender 250 is generally responsible for recommending chaos experiments. Recommended chaos experiments are discussed in conjunction with FIG. 3B.

Figure 3A:
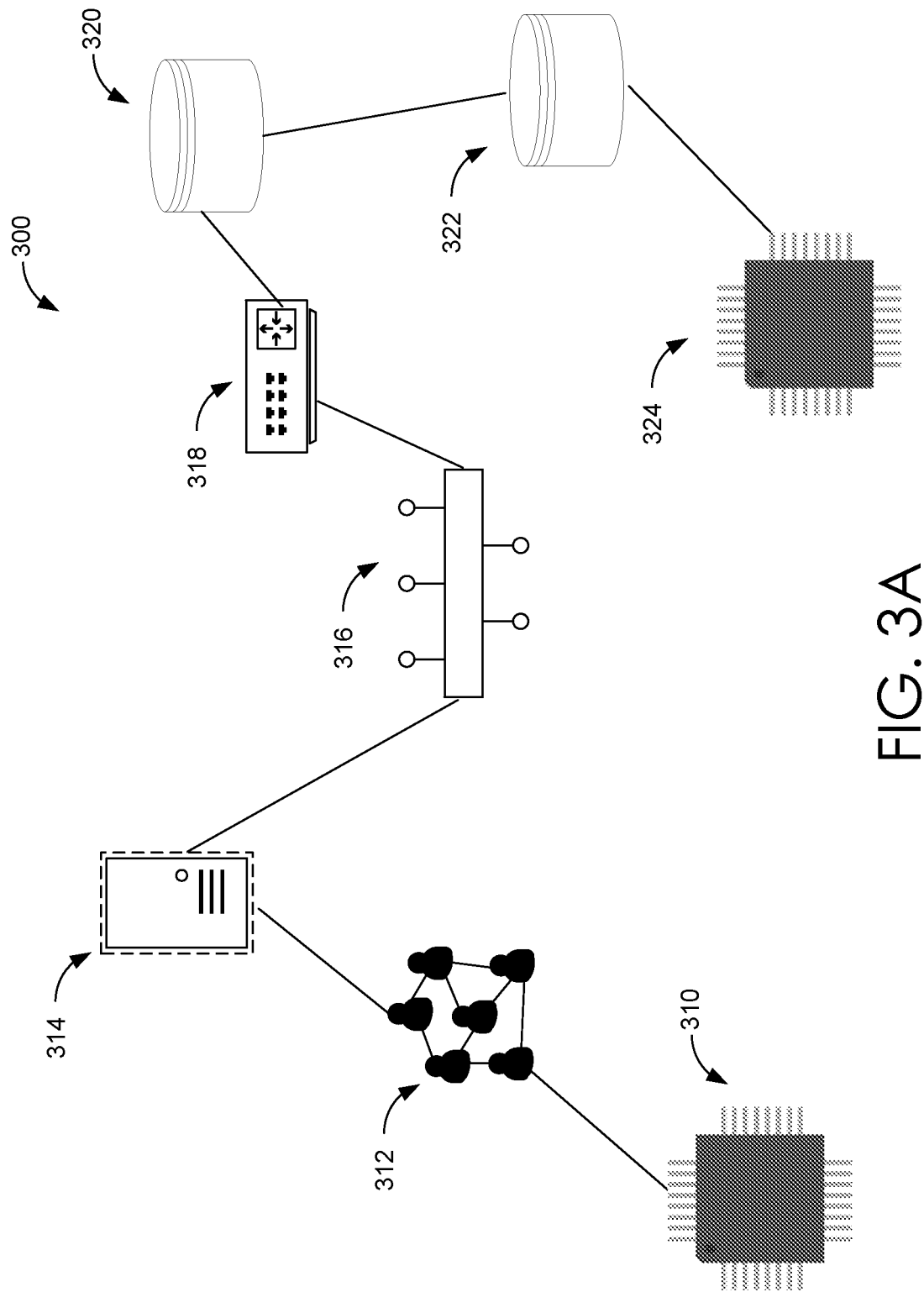
FIG. 3A shows an example visualization of a topology in accordance with various embodiments.

Turning attention to FIG. 3A, FIG. 3A shows a visualization of a topology 300 that is consistent with the various embodiments. Topology 300 may be an original topology or a recommended topology. As noted throughout, topology 300 may encode an original or recommended design and/or architecture for an application. Topology 300 may encode a mapping of the layers and components that an application is comprised of, as well as the connectivity, interoperability, and dependencies of the layers and components. Topology 300 includes a set of components. The set of components may include a first cache 310, a user group 312, a virtual domain name server (DNS) 314, a network router 316, a network traffic controller 318, a database 320, a virtualized storage drive 322, and a second cache 324. The dependencies between the components are illustrated via the connections between the components.

Figure 3B:
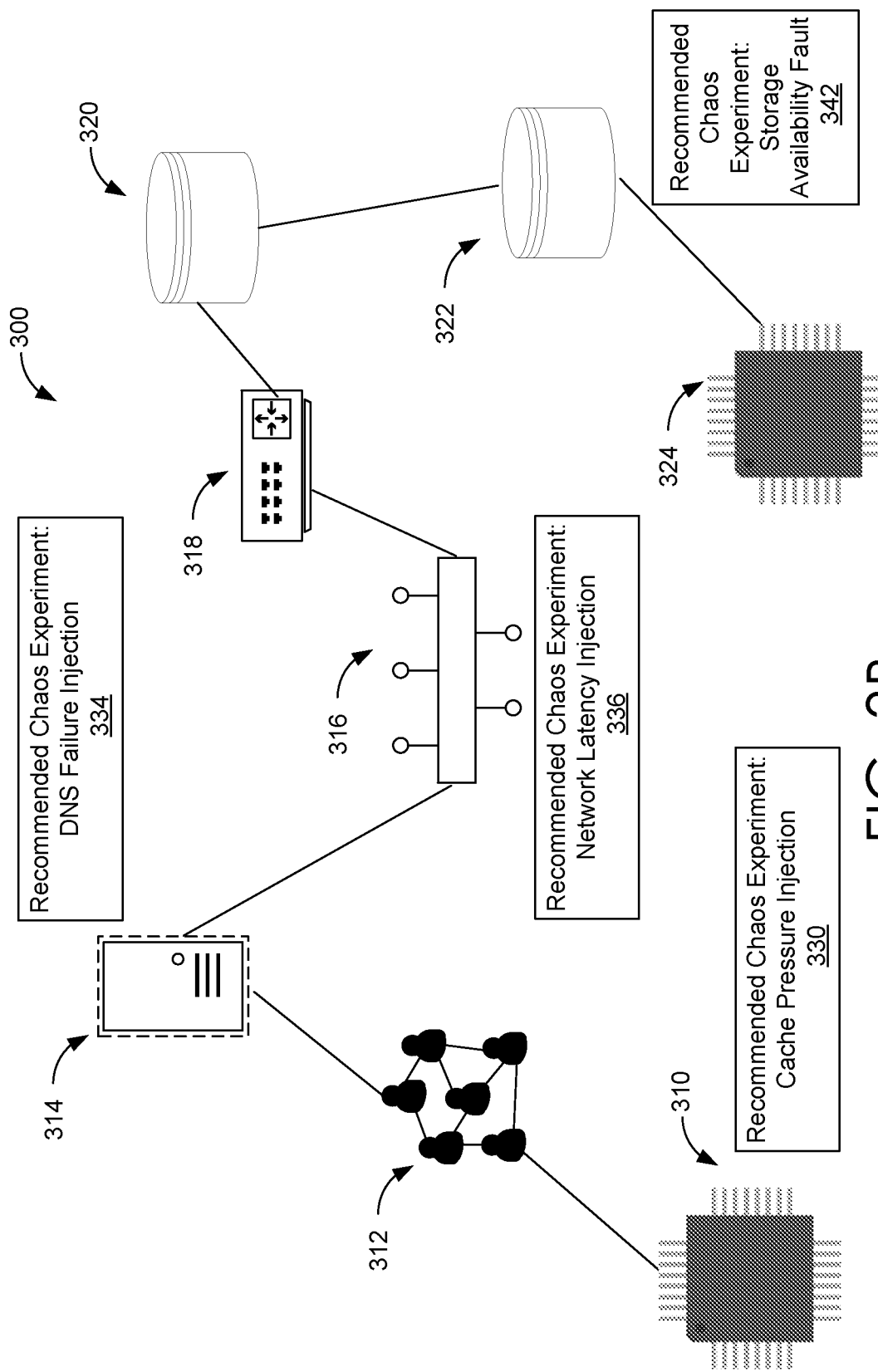
FIG. 3B shows an example set of recommended fault-injection experiments for the topology shown in FIG. 3A.

FIG. 3B shows a set of recommended fault-injection experiments for the topology shown in FIG. 3A. The set of fault-injection experiments may be determined by a chaos experiments recommender (e.g., chaos experiments recommender 250 of FIG. 2). The set of fault-injection experiments includes a cache pressure injection 330 for the first cache 310. The set of fault-injection experiments includes a DNS failure injection 334 for the DNS 314. The set of fault-injection experiments includes a network latency injection 336 for the network router 316. The set of fault-injection experiments additionally includes a storage availability fault 342 for the storage drive 322.

Methods for Providing Recommending Topologies

Figure 4:
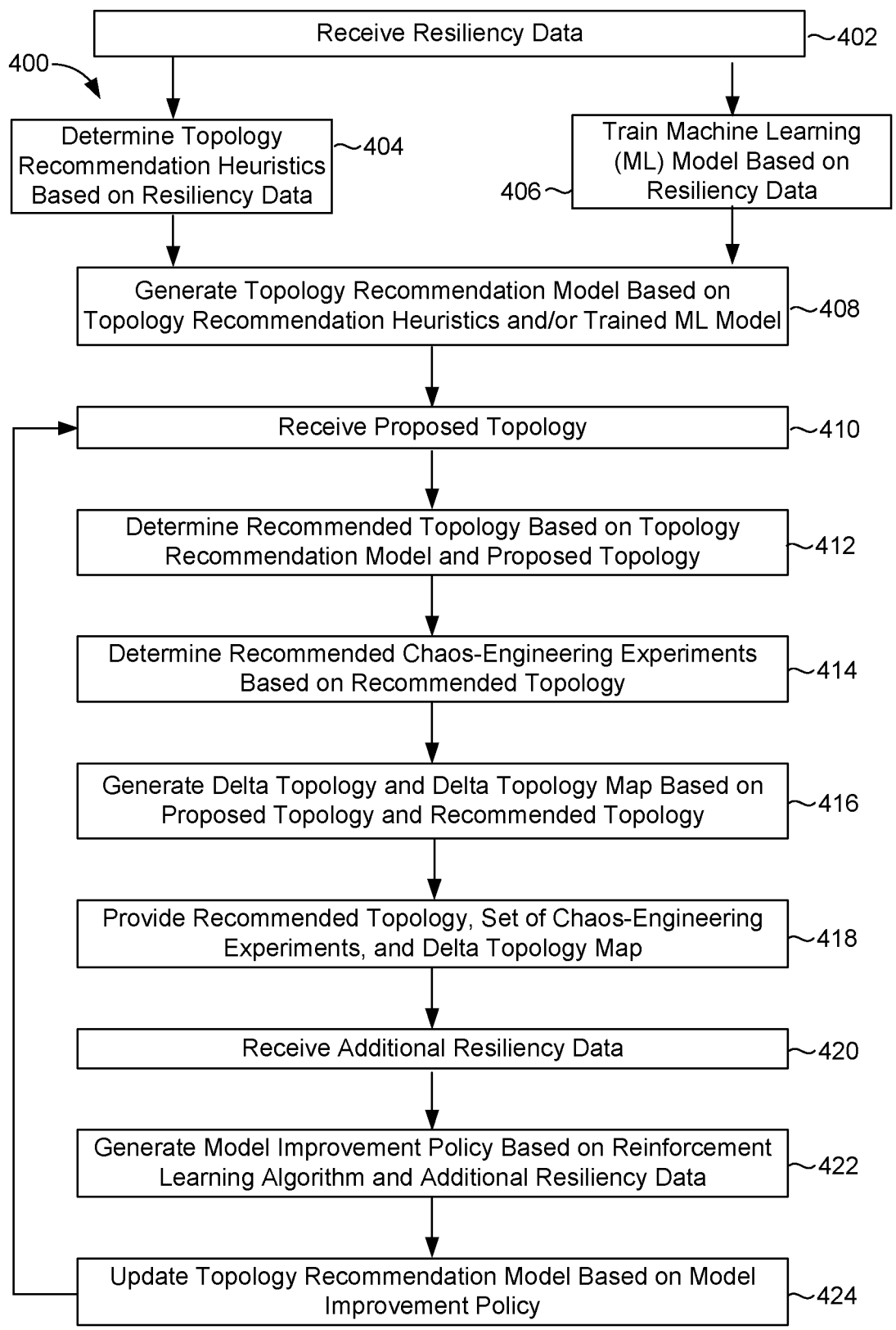
FIG. 4 provides an example flow diagram that illustrates a method 400 for providing an improved topology for the architecture of an application, in accordance with various embodiments.

FIG. 4 provides a flow diagram that illustrates a method 400 for providing an improved topology for the architecture of an application, in accordance with various embodiments. Generally, the flow diagram of FIG. 4 can be implemented using a TRP, such as TRP 120 of FIG. 1 or TRP 200 of FIG. 2, as well as ARDS, such as ARDS 140 of FIG. 1 or ARDS 280 of FIG. 2. Method 400 may be performed using any of the embodiments described herein.

Initially, method 400 begins at block 402, where resiliency data is received. The resiliency data may be received at a TPR, such as TRP 120 of FIG. 1 or TRP 200 of FIG. 2. The resiliency data may have been transmitted from ARDS, such as ARDS 140 of FIG. 1 or ARDS 280 of FIG. 2. The resiliency data may encode results from various chaos-engineering experiments (e.g., fault-injection experiments) performed on a set of topologies. In some embodiments, the resiliency data encodes chaos-engineering experimental data (e.g., chaos-engineering experimental data 286 of FIG. 2) and/or resiliency scores for each topology of the set of topologies (e.g., application resiliency scores 284 of FIG. 2). The resiliency data may include a set of experimental results corresponding to a set of fault-injection experiments performed on a set of topologies. The set of experimental results may indicate, for each topology of the set of topologies, a resiliency score associated with the topology.

At block 404, a set of topology recommendation heuristics (or rules) is determined based on the received resiliency data. Each heuristic of the set of heuristics may be employed for determining the recommended topology based on the original topology. The heuristics (or rules) may be based on the set of experimental results corresponding to the set of fault-injection experiments performed on the set of topologies. At block 406, one or more ML models (e.g., topology recommendation models 222 of FIG. 2) may be trained based on the resiliency data. Training the one or more ML methods may include employing one or more supervised learning algorithms and the set of experimental results as labeled training data. A topology recommendation model trainer (topology recommendation model trainer 220 of FIG. 2) may be employed to train the one or more ML models.

At block 408, a topology recommendation model may be generated based on the set of topology recommendation heuristics and/or the one or more trained ML models. In at least one embodiment (e.g., a rules-based embodiment), the topology recommendation model is based only on the set of topology recommendation heuristics. In rules-based embodiments, a rules-based recommendation module (e.g., rules-based recommendation module 212 of FIG. 2) implements the topology recommendation model. In other embodiments (e.g., ML-based embodiments), the topology recommendation model is based on and/or includes only the one or more trained ML models. In ML-based embodiments, the topology recommendation models are implemented by a ML-based recommendation module (e.g., ML-based recommendation module 214 of FIG. 2). In still other embodiments (e.g., mixed embodiments), the topology recommendation model is based on each of the set of topology recommendation heuristics and the one or more trained ML models. In mixed embodiments, the topology recommendation model is implemented by a combination of the rules-based recommendation module and the ML-based recommendation module. That is, in mixed embodiments, the topology recommendation model includes a combination of the set of topology recommendation heuristics and the one or more trained ML models.

At block 410, an original topology may be received. The original topology may be received at the TPR and from the ARDS. More specifically, the original topology may be received by a topology recommendation engine of the TRP (e.g., topology recommendation engine 210 of FIG. 2). In at least one embodiment, the original topology is encoded in application topology data (e.g., application topology data 282 of FIG. 2). The original topology may indicate a first design for an application. Furthermore, the original topology may be associated with a first resiliency score. The first design may be associated with a set of functionalities for the application. The first design may indicate a first set of components for the application. The original topology may be encoded via one or more topology templates.

At block 412, one or more recommended topologies (e.g., recommended topology 230 of FIG. 2) may be determined, generated, calculated, identified, and/or selected. In various embodiments, the recommended topology is determined by the topology recommendation engine via the rules-based recommendation module and/or the ML-based recommendation module implementing the topology recommendation model. Determining the recommended topology may be based on the topology recommendation model and the original topology. As noted throughout, in some embodiments (e.g., rules-based embodiments), the topology recommendation model is based on (or implements) a set of heuristics. In other embodiments (e.g., ML-based embodiments), the topology recommendation model is a trained ML model. In still other embodiments (e.g., mixed embodiments), the topology recommendation model is based on both the set of heuristics and the trained ML model. The recommended topology may indicate an alternative design for the application. The recommended topology may be associated with a second resiliency score that is greater than the first resiliency score. The alternative design may be associated with the set of functionalities for the application. The alternative design may indicate an alternative set of components for the application. The recommended topology may be encoded in one or more topology templates. It is contemplated that in some instances, the recommended topology may not indicate an alternative design for the application. For example, it is possible that the original topology or application design is the most resilient. In some embodiments, an indication may be provided indicating to the user that the original topology (or application design) is the most resilient, or is sufficiently resilient. It is also contemplated that, in some instances, a recommended topology is associated with a second resiliency score that is equal or lesser than the first resiliency score. In some of those instances, there may be other advantages, such as computational efficiencies, provided by the recommended topology. While in some other instances the recommendation may be ignored or may indicate that further training is needed for the topology recommendation model.

At block 414, a set of chaos-engineering experiments may be determined based on the recommended topology. The set of chaos-engineering experiments may include a set of recommended fault-injection experiments for the alternative design, based on the recommended topologies and the set of functionalities for the application. The set of recommended fault-injection experiments may include an indication of a subset of the alternative set of components and a fault-type associated with each component of the alternative set of components. Each fault-injection experiment of the set of recommended fault-injection experiments may indicate a potential event that effects the second resiliency score. A chaos experiments recommender (e.g., chaos experiments recommender 250 of FIG. 2) may determine the set of chaos-engineering experiments.

At block 416, a delta topology and a delta topology map may be determined and/or generated. The delta topology and/or the delta topology map may be based on the original topology and the recommended topology. The delta topology may encode a set of differences between the original topology and the recommended topology. In some embodiments, the differences in the delta topology also include, or are represented as, an instruction (or series of instructions) about how to convert from the original topology to the recommended topology. The delta topology map may encode a visualization of the delta topology. A topology delta generator (e.g., topology delta generator 240 of FIG. 2) may generate the delta topology and/or the delta topology map.

At block 418, the recommended topology, the set of chaos-engineering experiments (e.g., the set of recommended fault-injection experiments), the delta topology, and/or the delta topology map may be provided. For example, the TRP may provide the recommended topology, the set of chaos-engineering experiments, the delta topology, and/or the delta topology map as outputs.

At block 420, additional resiliency data may be received. In at least one embodiment, the additional resiliency data is received by a RL policy generator (e.g., RL policy generator 260 of FIG. 2). The additional resiliency data may be received and encoded in a data stream. The data stream may encode a set of experimental results corresponding to a set of fault-injection experiments performed on a set of topologies. At block 422, a model improvement policy may be generated based on a RL algorithm and the additional resiliency data. In some embodiments, the model improvement policy is generated by the RL policy generator. In at least one embodiment, the model improvement policy is generated based on the data stream and one or more RL algorithms.

At block 424, the recommendation topology model may be updated based on the model improvement policy. That is, the trained ML model and/or the topology recommendation model may be updated (e.g., improved) based on the model improvement policy. In various embodiments, a continuous topology improvement module (e.g., continuous topology improvement module 262 of FIG. 2) employs the model improvement policy to update and/or improve the topology recommendation model and/or the trained ML model. Method 400 may return to block 410 to receive a subsequent original topology. In such embodiments, the updated topology recommendation model and/or the ML model are employed to determine a subsequent recommended topology for the subsequent original topology.

Additional Embodiments

In at least one embodiment, a computer-implemented method includes receiving an original topology that indicates a first design for an application. The original topology is associated with a first resiliency score. The first design may be associated with a set of functionalities for the application. A recommended topology may be determined based on one or more rules, heuristics, and/or models and the original topology. The recommended topology may indicate an alternative design for the application. The recommended topology may be associated with a second resiliency score that is greater than the first resiliency score. The alternative design may be associated with the set of functionalities for the application. The recommended topology may be provided (e.g., to a user). At least one of the original topology or the recommended topology may be based on and/or encoded via one or more topology templates.

The first design may indicate a first set of components for the application. The alternative design may indicate an alternative set of components for the application. The method may further include determining a set of recommended fault-injection experiments for the alternative design. Such a determination may be based on the recommended topology and the set of functionalities for the application. The set of fault-injection experiments may include an indication of a subset of the alternative set of components and a fault-type associated with each component of the alternative set of components. Each fault-injection experiment of the set of recommended fault-injection experiments may indicate a potential event that effects the second resiliency score. The set of recommended fault-injection experiments may be provided (e.g., to a user).

In at least one embodiment, the model implements a set of heuristics. Each heuristic of the set of heuristics may be used for determining the recommended topology based on the original topology. Each heuristic may be based on a set of experimental results corresponding to a set of fault-injection experiments performed on a set of topologies.

In some embodiments, the model comprises a ML model. The method may further receive a set of experimental results. The set of experimental results may correspond to a set of fault-injection experiments performed on a set of topologies. The set of experimental results may provide, for each topology of the set of topologies, an indication of resiliency, such as a resiliency score, associated with the topology. The model is trained by employing one or more supervised learning algorithms and the set of experimental results as labeled training data. The recommended topology is then determined based on the trained ML model and the original topology.

As noted above, the model may comprise or implement a trained ML model. In such embodiments, the method further includes receiving a data stream. The data stream encodes a set of experimental results corresponding to a set of fault-injection experiments performed on a set of topologies. In some embodiments, a model improvement policy is generated. Generating the improvement model may be based on the data stream and one or more RL algorithms. The recommended topology may be determined based on the updated ML model and the original topology.

In at least one embodiment, the method further includes generating a delta topology. The delta topology may encode a set of differences between the original topology and the recommended topology. In some embodiments, the differences in the delta topology also include, or are represented as, an instruction (or series of instructions) about how to convert from the original topology to the recommended topology. A delta topology map may be generated based on the delta topology. The delta topology map may encode a visualization of the delta topology. The delta topology map may be provided (e.g., to a user).

Generalized Computing Device

Figure 5:
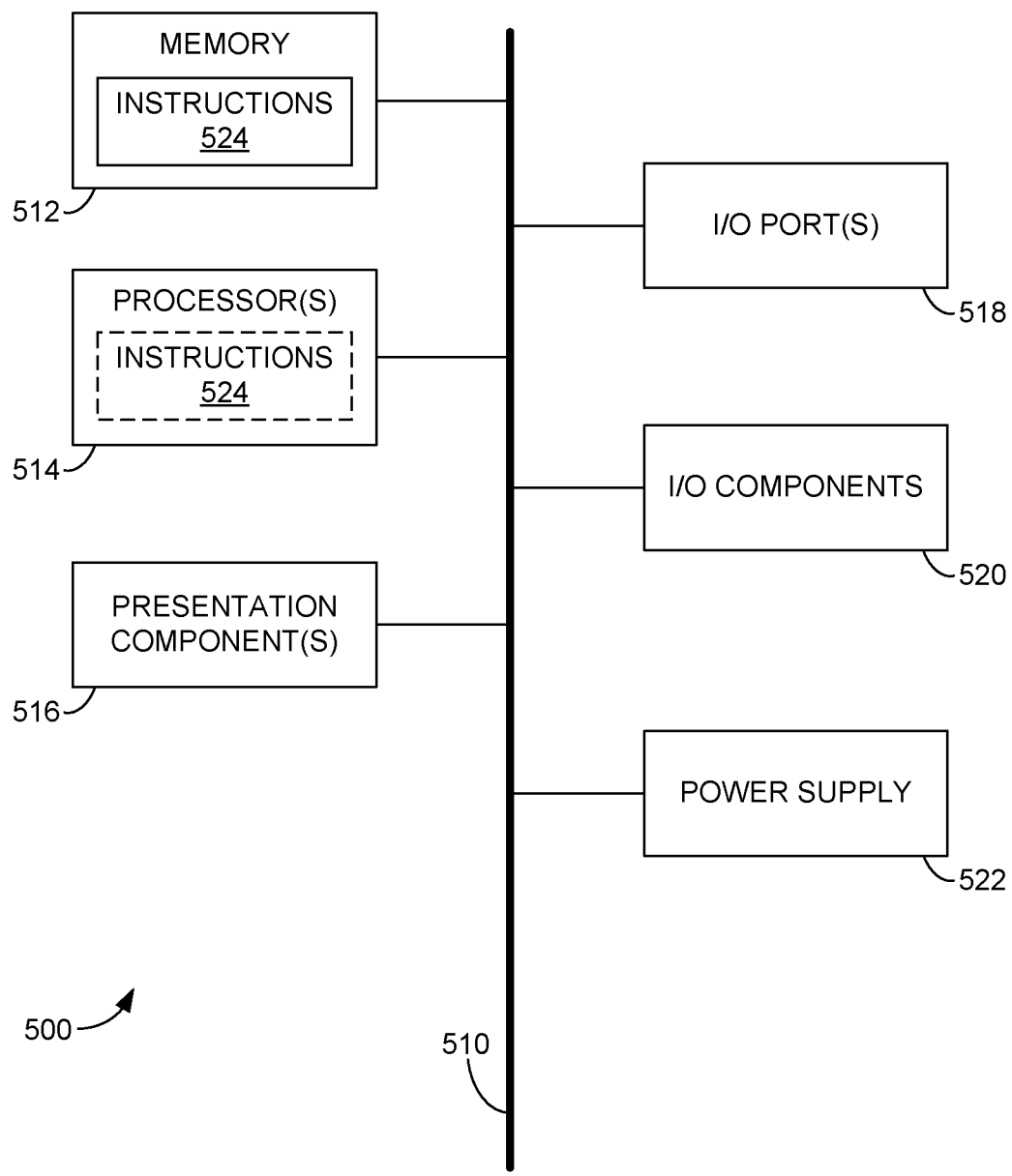
FIG. 5 is an example block diagram of a computing environment suitable for use in implementing aspects of the technology described herein.

With reference to FIG. 5, computing device 500 includes a bus 510 that directly or indirectly couples the following devices: memory 512, at least one processor 514, at least one presentation component 516, at least one input/output (I/O) port 518, at least one I/O component 520, and an illustrative power supply 522. Bus 510 represents what may be at least one bus (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The diagram of FIG. 5 is merely illustrative of an example computing device that can be used in connection with at least one embodiment of the present disclosure. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile media, removable and non-removable media. By way of example, computer-readable media comprises computer storage media and communication media. Computer storage media includes both volatile and nonvolatile, removable and non-removable media implemented in any method or technology for storage of information such as computer-readable instructions, data structures, program modules, or other data. Computer storage media includes random access memory (RAM), read only memory (ROM), electrically erasable programmable read-only memory (EEPROM), flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has at least one of its characteristics set or changed in such a manner as to encode information in the signal. By way of example, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes at least one processor 514 that reads data from various entities such as memory 512 or I/O components 520. As used herein, the term processor or "a processer" may refer to more than one hardware processor. For example, the term processor (or "a processor") may refer to a distributed processing or distributed computing architecture, cloud computing system, or parallel processing by more than a single processor. Presentation component(s) 516 presents data indications to a user or other device.

The I/O ports 518 allow computing device 500 to be logically coupled to other devices, including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some embodiments of computing device 500 may include at least one radio (or similar wireless communication components), which is not explicitly shown in FIG. 5. The radio transmits and receives radio or wireless communications. The computing device 500 may be a wireless terminal adapted to receive communications and media over various wireless networks. Computing device 500 may communicate via wireless protocols, such as code division multiple access (CDMA), global system for mobiles (GSM), or time division multiple access (TDMA), as well as others, to communicate with other devices. The radio communications may be a short-range connection, a long-range connection, or a combination of both a short-range and a long-range wireless telecommunications connection. Reference to "short" and "long" types of connections, does not refer to the spatial relation between two devices. Instead, this generally refers to short range and long range as different categories, or types, of connections (e.g., a primary connection and a secondary connection). A short-range connection may include, by way of example, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example, at least one of CDMA, General Packet Radio Service (GPRS), GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative means of implementing the aforementioned can be completed without departing from the scope of the claims below. Certain features and sub-combinations are of utility and may be employed without reference to other features and sub-combinations and are contemplated within the scope of the claims.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low-level software written in machine code, higher level software such as application software and any combination thereof. In this regard, the system components can manage resources and provide services for system functionality. Any other variations and combinations thereof are contemplated within embodiments of the present disclosure.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by at least one entity may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs herein may be combined with at least one of the specifically described alternatives. In particular, an embodiment that is claimed may contain a reference, in the alternative, to more than one other embodiment. The embodiment that is claimed may specify a further limitation of subject matter that is claimed.

The subject matter of embodiments of the disclosure is described with specificity herein to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where at least one feature is present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method comprising:
receiving an original topology that indicates a first design for an application, the first design being associated with a functionality for the application;
receiving experimental results corresponding to a fault-injection experiment performed on the original topology, the experimental results indicating a first resiliency score associated with the original topology;
providing the first resiliency score and the original topology to a machine learning (ML) model trained on resiliency scores for multiple different application topologies;
receiving as output from the ML model, a recommended topology that indicates an alternative design for the application, wherein the recommended topology is associated with a second resiliency score that is greater than the first resiliency score, and the alternative design is associated with the functionality for the application; and
providing the recommended topology.

2. The method of claim 1, wherein the first design indicates a first component for the application and the alternative design indicates an alternative component for the application, and the method further comprises:
determining, based on the recommended topology and the functionality for the application, a recommended fault-injection experiment for the alternative design, wherein the recommended fault-injection experiment includes an indication of a fault-type associated with the alternative component, and wherein the recommended fault-injection experiment indicates a potential event that effects the second resiliency score; and
providing the recommended fault-injection experiment.

3. The method of claim 1, wherein the ML model implements a heuristic that is based on experimental results corresponding to a fault-injection experiment performed on a topology.

4. The method of claim 1, wherein the ML model is an updated machine learning (ML) model and the method further comprises:
receiving a data stream that encodes experimental results corresponding to a fault-injection experiment performed on a topology;
generating a model improvement policy based on the data stream and a reinforcement learning (RL) algorithm; and
generating the updated ML model by updating a trained ML model based on the model improvement policy.

5. The method of claim 1, wherein each of the original topology and the recommended topology is encoded via a respective topology template.

6. The method of claim 1, further comprising:
generating a delta topology that encodes a difference between the original topology and the recommended topology;
generating a delta topology map that encodes a visualization of the delta topology; and
providing the delta topology map.

7. A computer system comprising:
a processing system comprising a processor; and
computer memory having computer-executable instructions embodied thereon, which, when executed by the processing system, cause the processing system to execute actions comprising:
receiving an original topology that indicates a first design for an application, wherein the first design is associated with a functionality for the application;
receiving experimental results corresponding to a fault-injection experiment performed on the original topology, the experimental results indicating a first resiliency score associated with the original topology;
providing the first resiliency score and the original topology to a machine learning (ML) model trained on resiliency scores for multiple different application topologies;
receiving as output from the ML model, a recommended topology that indicates an alternative design for the application, wherein the recommended topology is associated with a second resiliency score that is greater than the first resiliency score, and the alternative design is associated with the functionality for the application; and
providing the recommended topology.

8. The computer system of claim 7, wherein the first design indicates a first component for the application and the alternative design indicates an alternative component for the application, and the actions further comprise:

determining, based on the recommended topology and the functionality for the application, a recommended fault-injection experiment for the alternative design, wherein the fault-injection experiment includes an indication of a fault-type associated with the alternative component, and wherein the recommended fault-injection experiment indicates a potential event that effects the second resiliency score; and providing the fault-injection experiment.

9. The computer system of claim 7, wherein the ML model implements a heuristic that is based on experimental results corresponding to a fault-injection experiment performed on a topology.

10. The computer system of claim 7, the ML model is an updated machine learning (ML) model and the actions further comprise:
receiving a data stream that encodes experimental results corresponding to a fault-injection experiment performed on a topology;
generating a model improvement policy based on the data stream and a reinforcement learning (RL) algorithm; and
generating an updated ML model by updating a trained ML based on the model improvement policy.

11. The computer system of claim 7, wherein each of the original topology and the recommended topology is encoded via a respective topology template.

12. The computer system of claim 7, the actions further comprising:
generating a delta topology that encodes a difference between the original topology and the recommended topology;
generating a delta topology map that encodes a visualization of the delta topology; and
providing the delta topology map.

13. Computer storage media storing computer-useable instructions that, when used by a computing system, cause the computing system to perform actions comprising:
receiving an original topology that indicates a first design for an application, the first design being associated with a functionality for the application;
receiving experimental results corresponding to a fault-injection experiment performed on the original topology, the experimental results indicating a first resiliency score associated with the original topology;
providing the first resiliency score and the original topology to a machine learning (ML) model trained on resiliency scores for multiple different application topologies;
receiving as output from the ML model, a recommended topology that indicates an alternative design for the application, wherein the recommended topology is associated with a second resiliency score that is greater than the first resiliency score, and the alternative design is associated with the functionality for the application; and
providing the recommended topology.

14. The computer storage media of claim 13, wherein the first design indicates a first component for the application and the alternative design indicates an alternative component for the application, and the actions further comprise:
determining, based on the recommended topology and the functionality for the application, a recommended fault-injection experiment for the alternative design, wherein the fault-injection experiment includes an indication of a fault-type associated with the alternative component, and wherein the recommended fault-injection experiment indicates a potential event that effects the second resiliency score; and
providing the recommended fault-injection experiment.

15. The computer storage media of claim 13, wherein the ML model implements a heuristic that is based on an experimental result corresponding to a fault-injection experiment performed on a topology.

16. The computer storage media of claim 13, the actions further comprise:
receiving a data stream that encodes experimental results corresponding to a fault-injection experiment performed on a topology;
generating a model improvement policy based on the data stream and a reinforcement learning (RL) algorithm; and
generating an updated ML model by updating a trained ML based on the model improvement policy.

17. The computer storage media of claim 13, the actions further comprising:
generating a delta topology that encodes a difference between the original topology and the recommended topology;
generating a delta topology map that encodes a visualization of the delta topology; and
providing the delta topology map.

* * * * *